Patented Dec. 1, 1931

1,834,772

UNITED STATES PATENT OFFICE

KARL EBERS, OF AHRENSBURG IN HOLSTEIN, GERMANY

PROCESS OF BREAKING UP RAW HEAVY SPAR

No Drawing. Application filed December 7, 1926. Serial No. 153,205.

My invention relates to improvements in the process of breaking up raw heavy spar.

In my copending application for patent, Ser. No. 82,593, filed January 20, 1926, I have described a process of breaking up heavy spar containing calcium carbonate, the result being a white pigment consisting of pure barium sulphate. In the said process the heavy spar is first heated for driving out the carbonic acid from the calcium carbonate, the product is slaked, and the barium sulphate is separated from the whitewash (milk of lime) and other impurities by means of water, and finally the spar is successively washed with acids and water.

I have discovered that a modification of the said process can be used for breaking up spars which do not contain calcium carbonate as foreign matter, but other impurities such as silicic acid and silicates of aluminum, iron, etc. When treating the said spars in the raw or ground state with strong acids even in a heated state the said spars are not broken up in any way so as to produce a pure barium sulphate. But I have discovered that a material can be obtained from the said spars, which is similar in its quality to the blanc fixe, by heating the raw spar containing silicic acid at high temperature such for example as 1500° C., and thereafter throwing the same into water without first cooling the same. Thereby the material which before was of a stony character is made soft and disintegrated. Thereafter the material is treated with hydrochloric acid cold or better hot, whereby the silicic acid is separated in the form of colloidal flakes and can be readily separated from the heavy spar which now is in a very fine state. All the other impurities which may be present in the spar are taken up by the colloidal silicic acid, probably by adsorption. After finally grinding, which requires little power by reason of the soft state of the material, a very fine crystalline white spar is obtained which has about the same covering property and whiteness as the blanc fixe obtained by precipitation in the cold from barium chlorid and sulphuric acid.

It is very advantageous that the hot spar be directly thrown into the water without being first cooled off. If the highly heated spar is first allowed to cool off and thereafter treated with water, the result is not so satisfactory.

I claim:

1. The herein described process of manufacturing barium sulphate suitable as a pigment from raw heavy spar containing substantial silicic acid and silicates as impurities, which consists in first heating the heavy spar to a high temperature, treating the hot spar with water for breaking the same up, thereafter exposing the product to the action of acids, removing the separated colloidal silicic acid from the barium sulphate, and washing and grinding the said sulphate.

2. The herein described process of manufacturing barium sulphate suitable as a pigment from raw heavy spar containing substantial amounts of silicic acid and silicates as impurities, which consists in first heating the heavy spar to a temperature of about 1500° C., treating the hot spar with water for breaking the same up, thereafter exposing the product to the action of acids, removing the separated colloidal silicic acid from the barium sulphate, and washing and grinding the said sulphate.

3. In the treatment of heavy spar which contains silica and silicates as its principal impurities and which does not contain calcium carbonate as a large impurity, the herein described step of heating the said spar to a temperature of about 1500° C.

4. The herein described process of manufacturing barium sulphate suitable as a pigment from raw heavy spar containing substantial amounts of silicic acid and silicates as impurities, which consists in first heating the heavy spar to about 1500° C., then throwing this so heated material while still hot into water for breaking the same up, thereafter exposing the product to the action of acids, removing the separated colloidal silicic acid from the barium sulphate, and washing and grinding the said sulphate.

KARL EBERS.